US009965138B2

(12) United States Patent
Bamford et al.

(10) Patent No.: US 9,965,138 B2
(45) Date of Patent: May 8, 2018

(54) MOBILE COMMUNICATIONS DEVICE, NON-TRANSITORY COMPUTER-READABLE MEDIUM AND METHOD OF ACTIVATING UPDATE OF HOME SCREEN OF MOBILE COMMUNICATIONS DEVICE

(71) Applicant: HTC CORPORATION, Taoyuan, Taoyuan County (TW)

(72) Inventors: Drew Bamford, Bellevue, WA (US); David Brinda, Bellevue, WA (US); Peter Chin, Bellevue, WA (US); Jesse John Penico, Bellevue, WA (US); Chih-Wei Yang, Taoyuan (TW); Huai-Ting Huang, Taoyuan (TW)

(73) Assignee: HTC CORPORATION, Taoyuan, Taoyuan County (TW)

( * ) Notice: Subject to any disclaimer, the term of this patent is extended or adjusted under 35 U.S.C. 154(b) by 237 days.

(21) Appl. No.: 14/044,717

(22) Filed: Oct. 2, 2013

(65) Prior Publication Data
US 2014/0101609 A1    Apr. 10, 2014

Related U.S. Application Data

(60) Provisional application No. 61/709,997, filed on Oct. 5, 2012, provisional application No. 61/750,339, filed (Continued)

(51) Int. Cl.
*G06F 3/0481* (2013.01)
*G06F 3/01* (2006.01)
(Continued)

(52) U.S. Cl.
CPC ............ *G06F 3/0481* (2013.01); *G06F 3/017* (2013.01); *G06F 3/0482* (2013.01);
(Continued)

(58) Field of Classification Search
CPC ...... G06F 3/017; G06F 3/0485; G06F 3/0488; G06F 3/0481
(Continued)

(56) References Cited

U.S. PATENT DOCUMENTS

2009/0228825 A1    9/2009    Van Os et al.
2010/0017872 A1    1/2010    Goertz et al.
(Continued)

FOREIGN PATENT DOCUMENTS

CN        101778166 A        7/2010

OTHER PUBLICATIONS

StackExchange, "Pull-to-refresh and search bar", Feb. 2012, http://ux.stackexchange.com/questions/17882/pull-to-refresh-and-search-bar.*

(Continued)

*Primary Examiner* — Christopher J Fibbi
(74) *Attorney, Agent, or Firm* — Birch, Stewart, Kolasch & Birch, LLP

(57) ABSTRACT

A method of activating an update of a home screen of a mobile communications device is provided. The home screen is displayed on a display panel of the mobile communications device. The home screen includes a plurality of tiles displaying a plurality of feeds from one or more feed sources. The method includes performing one of updating the home screen or activating and displaying a menu bar on the display panel based on a distance of a downward scrolling on a top page of a home screen. A non-transitory computer-readable medium and a mobile communications device for activating an update of a home screen of a mobile communications device are also provided.

7 Claims, 14 Drawing Sheets

Related U.S. Application Data on Jan. 8, 2013, provisional application No. 61/812,217, filed on Apr. 15, 2013.

(51) Int. Cl.

| | | |
|---|---|---|
| *G06F 3/0484* | (2013.01) | |
| *G06F 3/0482* | (2013.01) | |
| *G06F 3/0488* | (2013.01) | |
| *G06F 3/0489* | (2013.01) | |
| *G06F 3/0483* | (2013.01) | |
| *G06F 3/0485* | (2013.01) | |

(52) U.S. Cl.
CPC .......... *G06F 3/0483* (2013.01); *G06F 3/0484* (2013.01); *G06F 3/0485* (2013.01); *G06F 3/0488* (2013.01); *G06F 3/0489* (2013.01)

(58) Field of Classification Search
USPC ........................................ 715/784, 830, 863
See application file for complete search history.

(56) References Cited

U.S. PATENT DOCUMENTS

| | | | |
|---|---|---|---|
| 2010/0105440 A1 | 4/2010 | Kruzeniski et al. | |
| 2010/0199180 A1* | 8/2010 | Brichter ........................ | 715/702 |
| 2011/0214086 A1 | 9/2011 | Narayanan et al. | |
| 2012/0056818 A1 | 3/2012 | Shafi et al. | |
| 2012/0079430 A1 | 3/2012 | Kwahk et al. | |
| 2012/0154444 A1 | 6/2012 | Fernandez | |
| 2012/0208593 A1* | 8/2012 | Yang et al. ................. | 455/556.1 |
| 2012/0226971 A1 | 9/2012 | Tocchini et al. | |
| 2012/0235930 A1* | 9/2012 | Lazaridis ................ | G06F 3/017 345/173 |
| 2012/0278704 A1 | 11/2012 | Ying et al. | |
| 2013/0033525 A1* | 2/2013 | Markiewicz .......... | G06F 3/0485 345/684 |
| 2013/0067421 A1* | 3/2013 | Osman .................. | G06F 3/0481 715/863 |
| 2014/0013271 A1* | 1/2014 | Moore et al. .................... | 715/792 |
| 2015/0193099 A1* | 7/2015 | Murphy ................. | G06F 3/0484 |
| 2015/0346925 A1 | 12/2015 | Yang et al. | |

OTHER PUBLICATIONS

European Summons to Attend Oral Proceedings, dated Sep. 11, 2014, for European Application No. 13020113.0.
Anonymous, "Launcher Pro Home Button Question," DROIDFORUMS.net http://www.droidforums.net/forum/android-general-discussions/917 . . . , Oct. 24, 2010 (printed Jan. 24, 2014), 2 pages, XP055098324.
Apple Inc., "iPhone User Guide for iOS 4.2 and 4.3 Software," 2011, pp. 1-274.
Apple Inc., "iPhone User Guide for iPhone OS 3.1 Software," 2009, pp. 1-217.
Cherry (http://www.sitepoint.com/author/mcherry/), "Revamp and Manage Your Android Homescreen with LauncherPro," Sitepoint, published Apr. 25, 2012, 20 pages, XP055098347.
European Search Report for European Application No. 13020112.2 dated Feb. 4, 2014.
European Search Report for European Application No. 13020113.0 dated Feb. 4, 2014.
Partial European Search Report for European Application No. 13020114.8 dated Feb. 6, 2014.
www.iMore.com, "How to use Activator on a jailbroken iPhone, iPad, or iPod touch," Uploaded on Feb. 7, 2012, 1 page, XP054975301.
European Office Action, dated Aug. 13, 2015, for European Application No. 13020112.2.
Anonymous, "layout—Pull-to-refresh and search bar—User Experience", May 28, 2012, XP055225488, Retrieved from the Internet:URL:http://web.archive.org/web/20120528090158/http://ux.stackexchange.com . . . 2 pages.
Frederick, "List Pull Refresh Plugin for Sencha Touch Vinyl Fox", Jan. 10, 2011, XP055225423, Retrieved from Internet:URL:http://web.archive.org/web/20120309033718/http://www.vinylfox.com . . . , 8 pages.
Kenny, "Pull down for Navigation-Inspect Element", Feb. 27, 2012, XP055225481, retrieved from internet:URL:http://web.archive.org/web/20120301061251/http://inspectelement.com/tutorials/pulldown . . . 8 pages.

* cited by examiner

After insertion of one new tile

| Local Content Feed Photo | Local Content Feed Video |
|---|---|
| P1 | V1 |
| P2 | V2 |
| P3 | V3 |
| P4 | V4 |
| P5 | V5 |
| P6 | V6 |
| P7 | V7 |
| P8 | V8 |
| P9 | V9 |
| P10 | V10 |
| P11 | V11 |
| P12 | V12 |
| P13 | V13 |
| P14 | V14 |
| P15 | V15 |

| Social Network Feed Facebook | Social Network Feed Twitter | Social Network Feed Linkedin |
|---|---|---|
| F1 | T1 | L1 |
| F2 | T2 | L2 |
| F3 | T3 | L3 |
| F4 | T4 | L4 |
| F5 | T5 | L5 |
| F6 | T6 | L6 |
| F7 | T7 | L7 |
| F8 | T8 | L8 |
| F9 | T9 | L9 |
| F10 | T10 | L10 |

| News Feed Yahoo | News Feed MSN |
|---|---|
| Y1 | M1 |
| Y2 | M2 |
| Y3 | M3 |
| Y4 | M4 |
| Y5 | M5 |
| Y6 | M6 |
| Y7 | M7 |
| Y8 | M8 |
| Y9 | M9 |
| Y10 | M10 |
| Y11 | M11 |
| Y12 | M12 |
| Y13 | M13 |
| Y14 | M14 |
| Y15 | M15 |

FIG. 14

MOBILE COMMUNICATIONS DEVICE, NON-TRANSITORY COMPUTER-READABLE MEDIUM AND METHOD OF ACTIVATING UPDATE OF HOME SCREEN OF MOBILE COMMUNICATIONS DEVICE

CROSS-REFERENCE TO RELATED APPLICATIONS

This nonprovisional application claims priority under 35 U.S.C. § 119(e) on U.S. Provisional Patent Application No. 61/709,997, filed on Oct. 5, 2012, U.S. Provisional Patent Application No. 61/750,339, filed on Jan. 8, 2013, and U.S. Provisional Patent Application No. 61/812,217, filed on Apr. 15, 2013, the entirety of which is incorporated herein by reference.

BACKGROUND OF THE INVENTION

1. Field of the Invention

The present invention relates to a mobile communications device, a non-transitory computer-readable medium and a method, and more particularly to a mobile communications device, a non-transitory computer-readable medium and a method of configuring a home screen of a mobile communications device, activating an update of a home screen of a mobile communications device, and/or navigating between a plurality of different views of a home screen of a mobile communications device.

2. Background of the Invention

Conventionally, a user interface of a handheld mobile electronic device includes a home screen with soft or hardwired button dedicated to bringing the user back to the home screen such that regardless of which way the user navigates, the user can always have a starting point of reference. Based on the starting point of reference, that is, the home screen, a user may access various applications and obtain different information from a variety of different sources or through different applications. However, as the number of application significantly grows, the volumes of information from these applications also grow tremendously, which makes it more difficult to manage.

SUMMARY OF THE INVENTION

Accordingly, it is an object of the present invention to provide a more effective mechanism to manage, configure, update and/or navigate the information, the user interface, the views and/or the applications to be displayed on a home screen of a mobile communications device.

According to a first aspect of the present invention, a method of configuring and updating a home screen of a mobile communications device is provided. The home screen is configured and updated by a processor and displayed on a display panel of the mobile communications device. The method comprises providing a plurality of tiles, each of the tiles displaying a feed from a corresponding one of feed sources; filling the tiles into the home screen that has a top page, one or more pages being addable immediately above the top page, each page having a layout of a plurality of slots, each of the slots being for accommodating a corresponding one of the tiles; and after an update that results in insertion of at least one new tile into the home screen occurs, placing the at least one new tile displaying a new feed on the top page, and moving at least one existing tile that was on the top page prior to the update to a new, different location of the home screen.

According to a second aspect of the present invention, a non-transitory computer-readable medium containing a computer program product comprises mobile communications device executable instructions for configuring and updating a home screen of a mobile communications device to be displayed on a display panel of the mobile communications device. The mobile communications device executable instructions comprises: providing a plurality of tiles, each of the tiles displaying a feed from a corresponding one of feed sources; filling the tiles into the home screen that has a top page, one or more pages being addable immediately above the top page, each page having a layout of a plurality of slots, each of the slots being for accommodating a corresponding one of the tiles; and after an update that results in insertion of at least one new tile into the home screen occurs, placing the at least one new tile displaying a new feed on the top page, and moving at least one existing tile that was on the top page prior to the update to a new, different location of the home screen.

According to a third aspect of the present invention, a mobile communications device comprises: a display panel displaying a home screen; and a processor connected to the display panel and configured to configure and update the home screen, the home screen comprising a plurality of tiles, each of the tiles displaying a feed from a corresponding one of feed sources, wherein the processor is configured to fill the tiles into the home screen that has a top page, one or more pages being addable immediately above the top page, each page having a layout of a plurality of slots, each of the slots being for accommodating a corresponding one of the tiles, and wherein after an update that results in insertion of at least one new tile into the home screen occurs, the processor is configured to place at least one new tile displaying a new feed on the top page, and to move at least one existing tile that was on the top page prior to the update to a new, different location of the home screen.

According to a fourth aspect of the present invention, a method of configuring a home screen of a mobile communications device is provided. The home screen is configured by a processor and displayed on a display panel of the mobile communications device. The method comprises: selecting some of candidate feeds from one or more of feed sources based on a predetermined budget, wherein each of the candidate feeds is categorized into one of a plurality of categories, and the predetermined budget sets a first predetermined maximum number of feeds to be selected in a corresponding one of the categories; inserting the selected feeds into the home screen; and displaying the home screen that displays the selected feeds on the display panel.

According to a fifth aspect of the present invention, a non-transitory computer-readable medium containing a computer program product comprises mobile communications device executable instructions for configuring a home screen of a mobile communications device to be displayed on a display panel of the mobile communications device. The mobile communications device executable instructions comprise: selecting some of candidate feeds from one or more of feed sources based on a predetermined budget, wherein each of the candidate feeds is categorized into one of a plurality of categories, and the predetermined budget sets a first predetermined maximum number of feeds to be selected in a corresponding one of the categories; inserting the selected feeds into the home screen; and displaying the home screen that displays the selected feeds on the display panel.

According to a sixth aspect of the present invention, a mobile communications device comprises: a processor configured to select some of candidate feeds from one or more of feed sources based on a predetermined budget, and configured to insert the selected feeds into a home screen, wherein each of the candidate feeds is categorized into one of a plurality of categories, and the predetermined budget sets a first predetermined maximum number of feeds to be selected in a corresponding one of the categories; and a display panel connected to the processor and displaying the home screen that displays the selected feeds.

According to a seventh aspect of the present invention, a method of activating an update of a home screen of a mobile communications device is provided. The home screen is displayed on a display panel of the mobile communications device. The home screen comprises a plurality of tiles displaying a plurality of feeds from one or more feed sources. The method comprises performing one of updating the home screen or activating and displaying a menu bar on the display panel based on a distance of a downward scrolling on a top page of a home screen.

According to an eighth aspect of the present invention, a non-transitory computer-readable medium containing a computer program product comprising mobile communications device executable instructions for activating an update of a home screen of a mobile communications device is provided. The home screen is displayed on a display panel of the mobile communications device. The home screen comprises a plurality of tiles displaying a plurality of feeds from one or more feed sources, the mobile communications device executable instructions comprises performing one of updating the home screen or activating and displaying a menu bar on the display panel based on a distance of a downward scrolling on a top page of a home screen.

According to a ninth aspect of the present invention, A mobile communications device comprises: a display panel displaying a home screen; and a processor connected to the display panel and configured to configure the home screen displayed on the display panel, the home screen comprising a plurality of tiles displaying a plurality of feeds from one or more feed sources, wherein the processor is further configured to: perform one of updating the home screen or activating and displaying a menu bar on the display panel based on a distance of a downward scrolling on a top page of a home screen.

According to a tenth aspect of the present invention, a method of navigating between a plurality of different views of a home screen of a mobile communications device is provided The mobile communications device comprises a home button, a processor, and a display panel configured to cooperate with the processor to display one of the views of the home screen. The method comprises: selectively displaying one of the views of the home screen on the display panel based on a number of times the home button is activated within a predetermined time period.

According to an eleventh aspect of the present invention, a non-transitory computer-readable medium containing a computer program product comprising mobile communications device executable instructions for navigating between a plurality of different views of a home screen of a mobile communications device is provided. The mobile communications device comprises a home button, a processor, and a display panel configured to cooperate with the processor to display one of the views of the home screen. The mobile communications device executable instructions comprises: selectively displaying one of the views of the home screen on the display panel based on a number of times the home button is activated within a predetermined time period.

According to a twelfth aspect of the present invention, a mobile communications device comprises: a home button; a display panel; and a processor connected to the display panel and the home button, and configured to navigate between a plurality of different views of a home screen, wherein the processor is further configured to cooperate with the display panel to: selectively display one of the views of the home screen on the display panel based on a number of times the home button is activated within a predetermined time period.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 illustrates an example of how the feeds in different sub-categories of the corresponding categories are sorted and selected in accordance with an exemplary embodiment of the present invention.

DETAILED DESCRIPTION OF THE PREFERRED EMBODIMENTS

Figure 1:
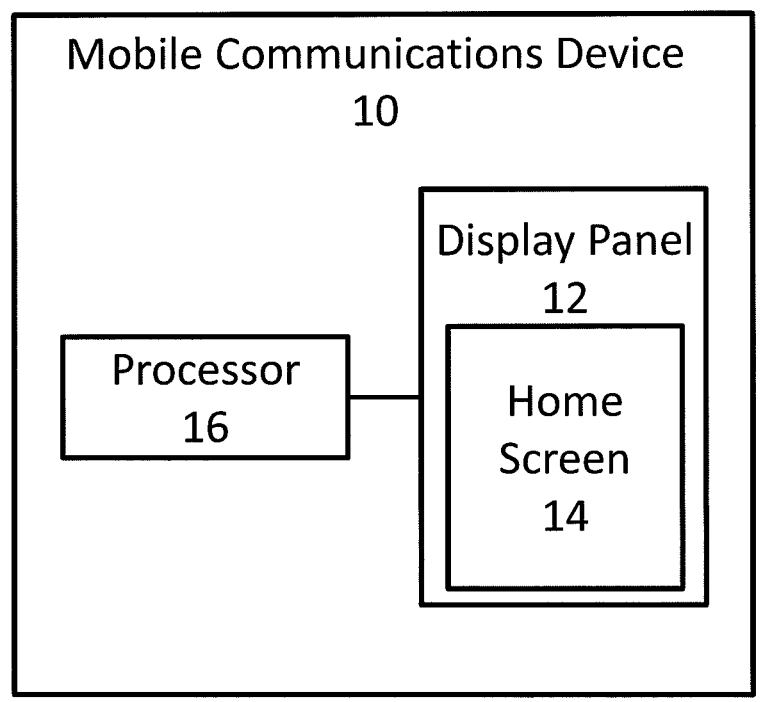
FIG. 1 illustrates a block diagram of a mobile communications device in accordance with an exemplary embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 illustrates a block diagram of a mobile communications device in accordance with an exemplary embodiment of the present invention. As embodied in FIG. 1, the mobile communications device 10 includes a display panel 12 and configured to cooperate with the processor to display one of the views of a home screen 14, and a processor 16 connected to the display panel 12 and configured to configure the home screen 14 displayed on the display panel 12.

The home screen can be configured into different views such as the Feed view, the Widget view, and the All Apps view. The Widget view is a view of the home screen which may include at least one widget and application icons in the same home screen layout. Each application icon represents a shortcut to activate a corresponding one of the applications. An All Apps view is a view of the home screen which shows mostly application icons. The Feed view is a view of the home screen which displays a weather tile on top showing weather information and displays pictures and/or texts from a variety of difference sources in blocks of various sizes.

Navigation Between Different Views of Home Screen

In order to navigate between a plurality of different views of a home screen of a mobile communications device, as embodied in the present application, the mobile communications device comprises a home button; a display panel; a processor connected to the display panel and the home button, and configured to navigate between a plurality of different views of a home screen, wherein the processor is further configured to cooperate with the display panel to selectively display one of the views of the home screen on the display panel based on a number of times the home button is activated within a predetermined time period.

Figure 2:
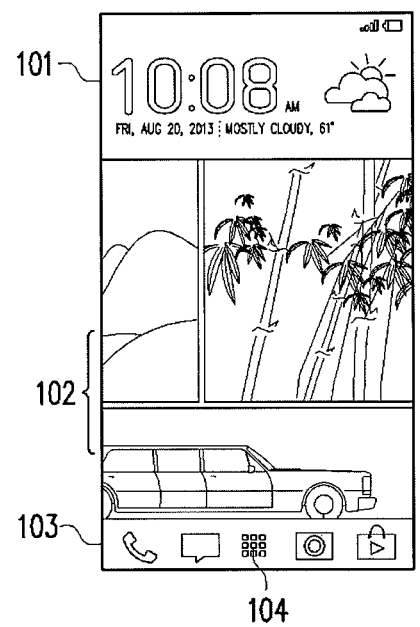
FIG. 2 illustrates the Feed view of the home screen in accordance with an exemplary embodiment of the present invention.

FIG. 2 illustrates the Feed view of the home screen in accordance with an exemplary embodiment of the present invention. As shown in FIG. 2, the Feed view may include a time and weather tile 101 on the top of the home screen, which displays the current time, the current date, and the current weather information. The body 102 of the Feed view includes tiles of the same or different sizes to present different feeds from a variety of different sources. The feeds may include information obtained from external servers such as news servers, the social network such as the Facebook server and the Twitter server, the Google server, etc. The feed server may also include information native to the mobile communications device. Since pictures selected from various sources may vary in size, the tile sizes would be dynamically chosen, the pages displayed in the Feed view could be sorted in an ascending or descending order according to time.

A user may switch between the Feed view and the Widget view in response to a horizontal panning. For instance, when a user performs a touch and slide action toward the left or the right, the user may switch back and forth between the Feed view and the Widget view.

In an exemplary embodiment, a toggle switch icon is displayed on the display panel exhibiting a specific one of the views that is not currently displayed, a first one of the views of the home screen that is currently displayed is switched to a second one of the views of the home screen upon activation of the toggle switch icon; and the second one of the views of the home screen that is currently displayed is switched back to the first one of the views of the home screen upon further activation of the toggle switch icon. In an exemplary embodiment, the toggle switch icon exhibits a representative of the second one of the views when the first one of the views of the home screen is currently display, and the toggle switch icon exhibits a representative of the first one of the views when the second one of the views of the home screen is currently display.

For example, as embodied in FIG. 2, at the bottom edge of the touch screen, the touch screen may include a panel 103 which could be horizontally scrollable to display different application icons. The center of the panel 103 may include a toggle switch 104, which can be activated to switch to a different view as indicated by the icon of the toggle switch 104. For instance, when the home screen is currently displaying the Feed view or the Widget view, the toggle switch 104 exhibits a representative of an All Apps view on the panel 103. Therefore, the user can be taken from the Feed view or the Widget view to the All Apps view upon an activation of the toggle switch. When the home screen is switched from the Feed view or the Widget view to the All Apps view (and the toggle switch 104 is currently exhibiting a representative of the Feed view or the Widget view) and the user presses the toggle switch for the second time, the user will be taken from the All Apps view back to the Feed view or the Widget view.

In an exemplary embodiment, one of an immediately previous view of the home screen and a predetermined one of the views of the home screen is displayed on the display panel when the home button is activated once within the predetermined time period; and the other one of the immediately previous view of the home screen and the predetermined one of the views of the home screen is displayed on the display panel when the home button is activated twice within the predetermined time period. In an exemplary embodiment, the predetermined one of the views of the home screen is displayed on the display panel when the home button is activated more than twice within the predetermined time period.

Figure 3:
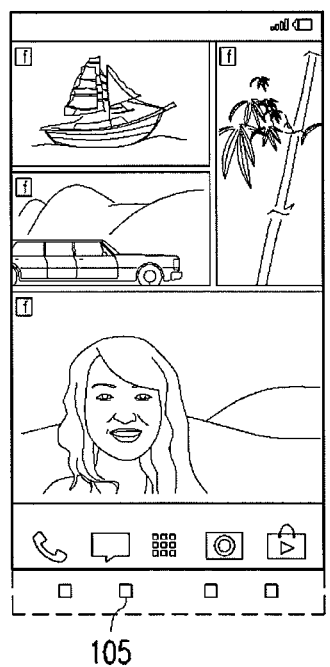
FIG. 3 illustrates the Feed view of the home screen after an upward vertical scrolling in accordance with an exemplary embodiment of the present invention.

For example, as embodied in FIG. 3, the bottom of the panel 103 may include a home button 105, which can be activated to bring a user to one of the views of the home screen. It should be noted that the home button operates in a user configurable manner as a user could be brought to different views based on the number of times the user activates the home button. For instance, the user can pre-configure the home button 105 so that when a user activates the home button for the first time, the user activates the last visited home screen view. However, if the user activates the home button twice, the user navigates to a user preconfigured view of the home screen. This means that if the user has preconfigured the home button to navigate to the Widget view, the user will be taken back to the Widget view when the home button is twice activated. However, if the user activates the home button once, the user would activate the last visited home screen view.

In another exemplary embodiment, the actions which result from the once activation or twice activation could be switched around. For instance, the user can preconfigure the home button 105 so that when a user activates the home button for the first time, the user navigates to a user preconfigured view of the home screen. This means that if the user has preconfigured the home button to navigate to the Widget view, the user will be taken back to the Widget view when the home button is once activated. However, if the user activates the home button twice, the user would activate the last visited home screen view.

In another exemplary embodiment, when a user presses the home button for the third time and beyond, the user would still be taken to the user preconfigured home screen view.

In an exemplary embodiment, a predetermined one of the views of the home screen is displayed on the display panel when the home button is activated once within the predetermined time period. In an exemplary embodiment, when the predetermined one of the views of the home screen is currently displayed and the home button is activated once within the predetermined time period, the predetermined one of the views of the home screen is taken to a top of the predetermined one of the views of the home screen on the display panel.

For example, the user can preconfigure the home button 105 so that when the user activates the home button once within a predetermined time period, the user navigates to a user preconfigured view of the home screen, e.g., the Feed view, the Widget view or the All Apps view. If, however, before the user activates the home button 105, the current home screen displayed on the display panel is for example the Feed view, and the user preconfigured view is also the Feed view (i.e., the current home view is the same as the user preconfigured view), then the Feed view will be scrolled upward to its top portion and displayed on the display panel when the user activates the home button 105 once within the predetermined time period.

In an exemplary embodiment, a processor of the mobile communications device is configured to cooperate with the display panel to perform the process of navigating between a plurality of different views of a home screen of a mobile communications device. In another exemplary embodiment, a non-transitory computer-readable medium (e.g., a memory device in the mobile communications device/processor or an external memory device accessible by the mobile communications device/processor) containing a computer program product comprising mobile communications device executable instructions can be executed by the mobile communications device to perform the process of navigating between a plurality of different views of a home screen of a mobile communications device.

FIG. 3 illustrates the Feed view after an upward vertical scrolling in accordance with an exemplary embodiment of the present invention. A user may browse contents below the current view of the home screen by scrolling upwards from the Feed view as shown in FIG. 2 by performing a touch and upward swipe gesture. The scroll upward will bring up older updates and can be presented in a different tile layout.

Activation of Update of Home Screen

In order to activate an update of a home screen of a mobile communications device, as embodied in the present application, a mobile communications device comprises a display panel displaying a home screen; and a processor connected to the display panel and configured to configure the home screen displayed on the display panel, the home screen comprising a plurality of tiles displaying a plurality of feeds from one or more feed sources, wherein the processor is further configured to: perform one of updating the home screen or activating and displaying a menu bar on the display panel based on a distance of a downward scrolling on a top page of a home screen.

Figure 4:
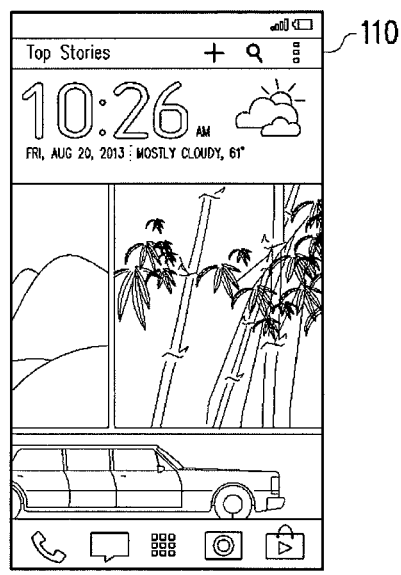
FIG. 4 illustrates the Feed view of the home screen after a downward vertical scrolling in accordance with an exemplary embodiment of the present invention.

For example, FIG. 4 illustrates the Feed view after a downward vertical scrolling in accordance with an exemplary embodiment of the present invention. Downward vertical scrolling can be activated when a user performs a touch and downward gesture on the touch screen. The downward vertical scrolling would tug everywhere on the screen and bring up a menu bar 110, which can be attached to a top/lower edge of the time and weather tile 101. From the menu bar 110, a user may browse and search top stories of various new servers and share the stories on a social network. The downward tugging action may trigger an update of the feeds according to the scrolling speed, distance and/or the time of scrolling.

A measure is put in place to prevent unnecessary update of the feeds. When unintended updates of the feeds are performed against the will of the user, not only is time wasted but battery power would be drained. For instance, when the user tries to scroll from the bottom of the feeds to the top of the feeds really fast, the user may accidentally trigger the update by accidentally performing one touch and swipe stroke too much, since it is difficult for a normal user to control the timing and the number of the strokes when the scrolling is very fast. Therefore, a set of requirements based on time, distance and/or speed of the downward vertical scrolling is put in place to prevent unintentional update of the feeds.

In an exemplary embodiment, the process of performing one of updating the home screen or activating and displaying the menu bar on the display panel is based on both the distance and the speed of the downward scrolling on a top page of a home screen. In an exemplary embodiment, the speed and the distance of the downward scrolling on the top page of the home screen is measured; and the home screen is updated only when the speed of the downward scrolling is determined to be not greater than a predetermined speed threshold and the distance of the downward scrolling is greater than a predetermined distance threshold. In an exemplary embodiment, a menu bar is activated and displayed on the display panel when either the speed of the downward scrolling is determined to be greater than the predetermined speed threshold, or the speed of the downward scrolling is determined to be not greater than the predetermined speed threshold but the distance of the downward scrolling is determined to be not greater than the predetermined distance threshold. In an exemplary embodiment, the speed of the downward scrolling on the top page of the home screen is measured, the menu bar is activated and displayed on the display panel when the speed of the downward scrolling is determined to be greater than a predetermined speed threshold, the distance of the downward scrolling is measured when the speed of the downward scrolling is determined to be not greater than the predetermined speed threshold, the home screen is updated when the distance of the downward scrolling is determined to be greater than a predetermined distance threshold; and the menu bar is activated and displayed on the display panel when the distance of the downward scrolling is determined to be not greater than a predetermined distance threshold. In an exemplary embodiment, the menu bar is activated and displayed on the display panel without updating the home screen when the speed of the downward scrolling is determined to be greater than the predetermined speed threshold. In an exemplary embodiment, the menu bar is activated and displayed on the display panel without updating the home screen when the distance of the downward scrolling is determined to be not greater than the predetermined distance threshold.

Figure 5:
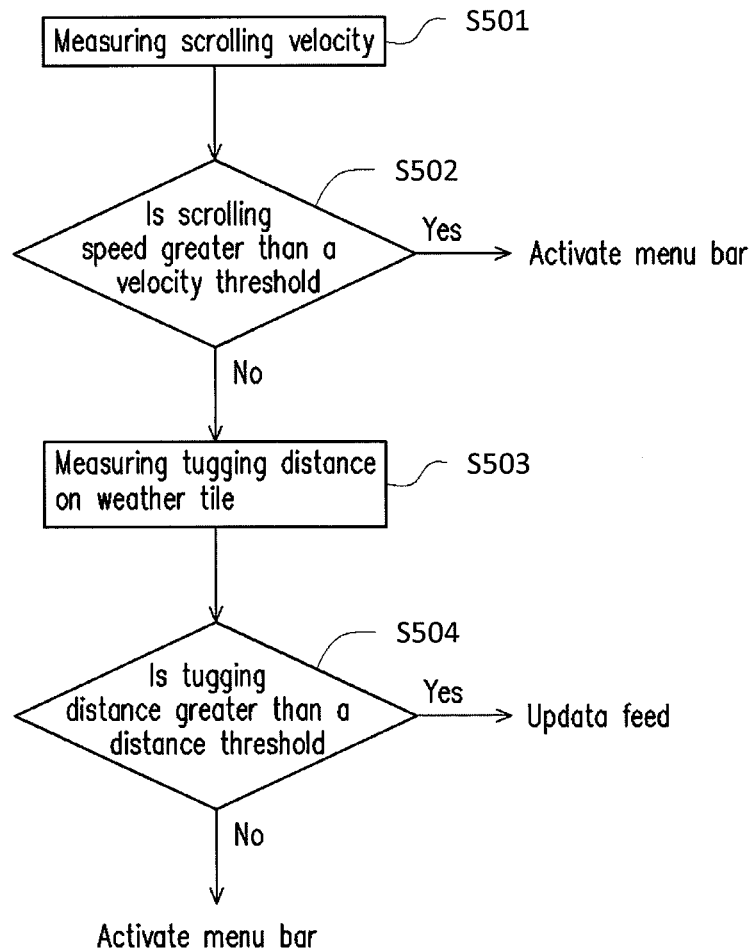
FIG. 5 is a flow chart illustrating the requirements upon which the automatic updates of the feeds would be triggered in accordance with an exemplary embodiment of the present invention.

FIG. 5 is a flow chart illustrating the requirements upon which the automatic updates of the Feed would be triggered in accordance with an exemplary embodiment of the present invention. In step S501, the velocity/speed of the downward scrolling is measured. The scrolling velocity/speed could be measured according to the number of pixels per second or could be measured based on the displacement of a moving pixel. After the scrolling velocity/speed has been measured, in step S502, the scrolling velocity/speed is compared against a non-zero predetermined velocity/speed threshold. If the scrolling velocity/speed exceeds the predetermined velocity/speed threshold, then only the menu bar 110 is displayed and an update is not performed. If the scrolling velocity/speed does not exceed the predetermined velocity/speed threshold, then the process proceeds to step S503 during which the distance of the tug is measured. After the distance of the tug has been measured, then in step S504, the distance of the tug is measured against a predetermined distance threshold. If the tugging distance exceeds the predetermined distance threshold, then the feeds are updated. Otherwise, only the menu bar 110 is displayed as the feeds are not updated.

In another exemplary embodiment, the process of performing one of updating the home screen or activating and displaying the menu bar on the display panel is based on the distance of the downward scrolling on a top page of a home screen. In an exemplary embodiment, the distance of the downward scrolling on the top page of the home screen is measured, a menu bar is activated and displayed on the display panel when the distance of the downward scrolling on the top page of the home screen is determined to be not greater than a predetermined distance threshold, and the home screen is updated after the distance of the downward scrolling on the top page of the home screen is determined to be greater than a predetermined distance threshold. In an exemplary embodiment, an initiation requirement to be fulfilled to initiate updating the home screen is displayed on the home screen when the distance of the downward scrolling on the top page of the home screen is determined to be greater than the predetermined distance threshold, wherein the home screen is updated upon fulfillment of the initiation requirement. In an exemplary embodiment, the time of the last update of the home screen is displayed on the home screen with the initiation requirement when the distance of the downward scrolling on the top page of the home screen is determined to be greater than the predetermined distance threshold. In an exemplary embodiment, an updating progress on is displayed on the home screen until completion of updating the home screen.

Figure 6:
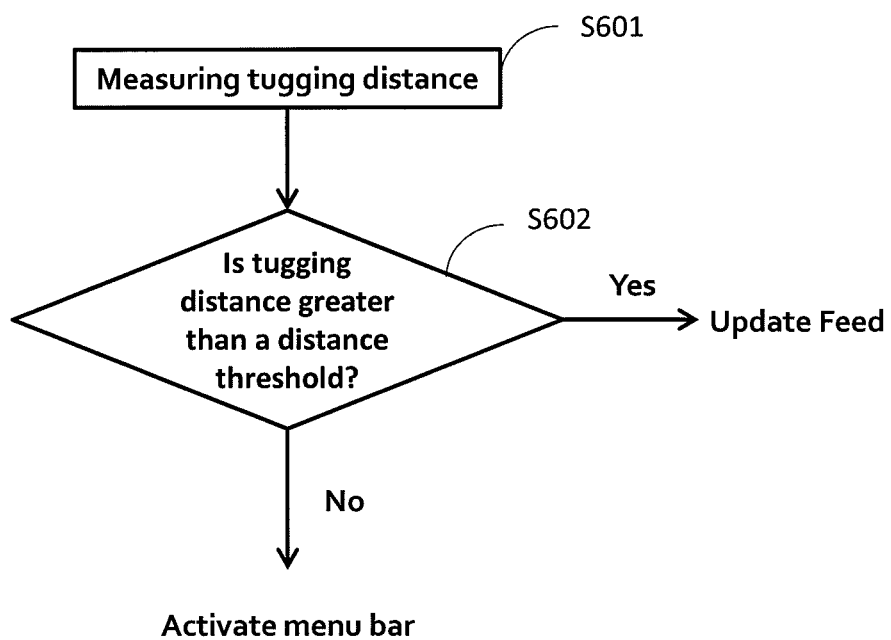
FIG. 6 illustrates a flow chart to update the feeds in accordance with another exemplary embodiment of the present invention.

For example, as embodied in FIG. 6, which illustrates a flow chart to update the feeds in accordance with an exemplary embodiment of the present invention. In step S601, the distance of the downward tug/scrolling is measured. In step 602, the measured distance of the downward tug/scrolling is compared with a predetermined distance threshold. If the measured distance of the downward tug/scrolling is not greater than the predetermined distance threshold, a menu bar is activated and displayed on the display panel, and the home screen will not be updated. If the measured distance of the downward tug/scrolling is greater than a predetermined distance threshold, then the home screen will be updated.

Figures 7A, 7B, 7C, 7D:
FIGS. 7A-7D illustrate how to trigger the home screen update or the activation and display of the menu bar in accordance with another exemplary embodiment of the present invention.

In addition, as embodied in FIGS. 7A-D, which illustrate how to trigger the home screen update or the activation and display of the menu bar. As shown in FIG. 7A, a home screen is displayed on the display panel. In FIG. 7B, a downward tug/scrolling with a distance that is not greater than a predetermined distance threshold occurs on the home screen, and the menu bar (e.g., the portion below the time and weather tile showing "Top Stories" and other items in FIG. 7B) is activated and displayed on the display panel. In FIG. 7C, when the distance the downward tug/scrolling is greater than the predetermined distance threshold, an initiation requirement to be fulfilled to initiate updating the home screen (e.g., the texts "RELEASE TO REFRESH" shown in FIG. 7C) is displayed on the home screen. In addition, as embodied in FIG. 7C, the time of the last update of the home screen (e.g., "LAST UPDATED 10:44 AM" shown in FIG. 7C) is also displayed on the home screen. In FIG. 7D, the initiation requirement (e.g., the downward tug/scrolling is released) is fulfilled to initiate updating the home screen, and an updating progress (e.g., "UPDATING" shown in FIG. 7D) is displayed on the home screen until completion of updating the home screen.

In an exemplary embodiment, a processor of the mobile communications device is configured to cooperate with the display panel to perform the process of activating an update of a home screen of a mobile communications device. In another exemplary embodiment, a non-transitory computer-readable medium (e.g., a memory device in the mobile communications device/processor or an external memory device accessible by the mobile communications device/processor) containing a computer program product comprising mobile communications device executable instructions can be executed by the mobile communications device to perform the process of activating an update of a home screen of a mobile communications device.

Configuration of Feeds on Home Screen

In order to configuring a home screen of a mobile communications device, as embodied in the present application, a mobile communications device comprises a display panel displaying a home screen; and a processor connected to the display panel and configured to configure and update the home screen, the home screen comprising a plurality of tiles, each of the tiles displaying a feed from a corresponding one of feed sources, wherein the processor is configured to fill the tiles into the home screen that has a top page, one or more pages being addable immediately above the top page, each page having a layout of a plurality of slots, each of the slots being for accommodating a corresponding one of the tiles, and wherein after an update that results in insertion of at least one new tile into the home screen occurs, the processor is configured to place at least one new tile displaying a new feed on the top page, and to move at least one existing tile that was on the top page prior to the update to a new, different location of the home screen. In an exemplary embodiment, the new location of the at least one existing tile is on a page below the top page or on the top page. In an exemplary embodiment, the process of placing at least one new tile displaying a new feed on the top page, and moving at least one existing tile that was on the top page prior to the update to a new, different location of the home screen includes inserting at least one new page into the home screen as the top page to accommodate the at least one new tile; and moving the top page prior to the update downward to be below the new page. In an exemplary embodiment, in the process of moving the top page prior to the update downward to be below the new page, all existing tiles that were on the top page prior to the update remain on the same page that is moved downward to be below the new page. In an exemplary embodiment, the process of placing at least one new tile displaying a new feed on the top page, and moving at least one existing tile that was on the top page prior to the update to a new, different location of the home screen includes moving all existing pages prior to the update downward to be below the new page.

Figure 8A:
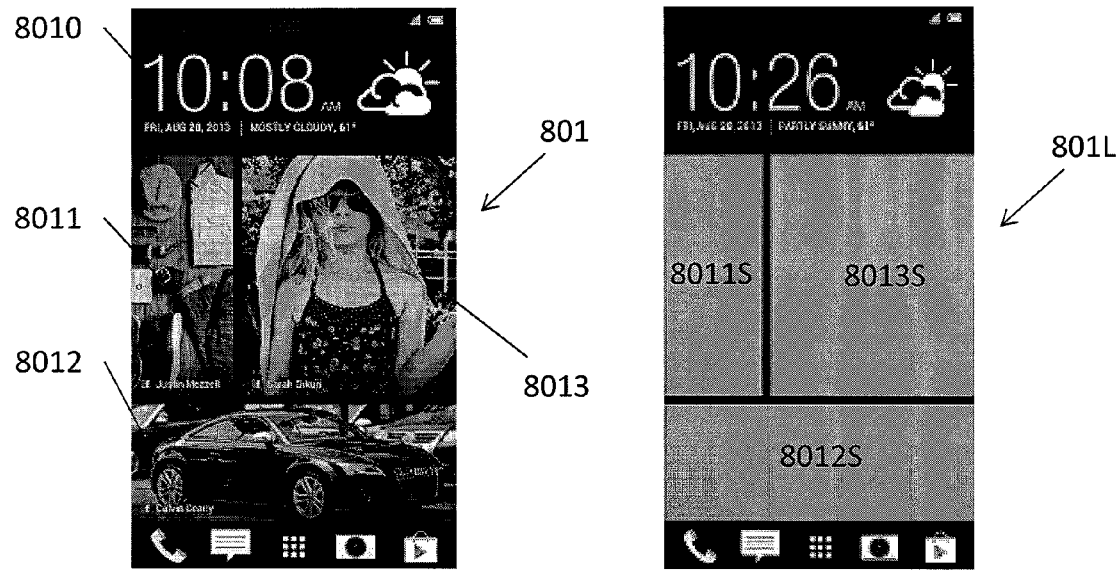
FIGS. 8A-8B illustrate a top page and a second page of the home screen and the corresponding layouts of the top page and the second page of the home screen in accordance with another exemplary embodiment of the present invention.

For example, as embodied in FIG. 8A, the home screen has a top page 801 with a plurality of tiles 8011-8013 inserted therein, and can have one or more pages addable immediately above the top page 801. For example, the page 802 immediately below the top page 801 may be the previous top page with tiles 8021-8024, and the current top page 801 is added immediately above the top page 801 after an update that results in insertion of at least one new tile (e.g., tiles 8011-8013) into the home screen occurs. As shown in FIG. 8A, each of the tiles displays a feed from a corresponding one of feed sources.

Figure 8B:
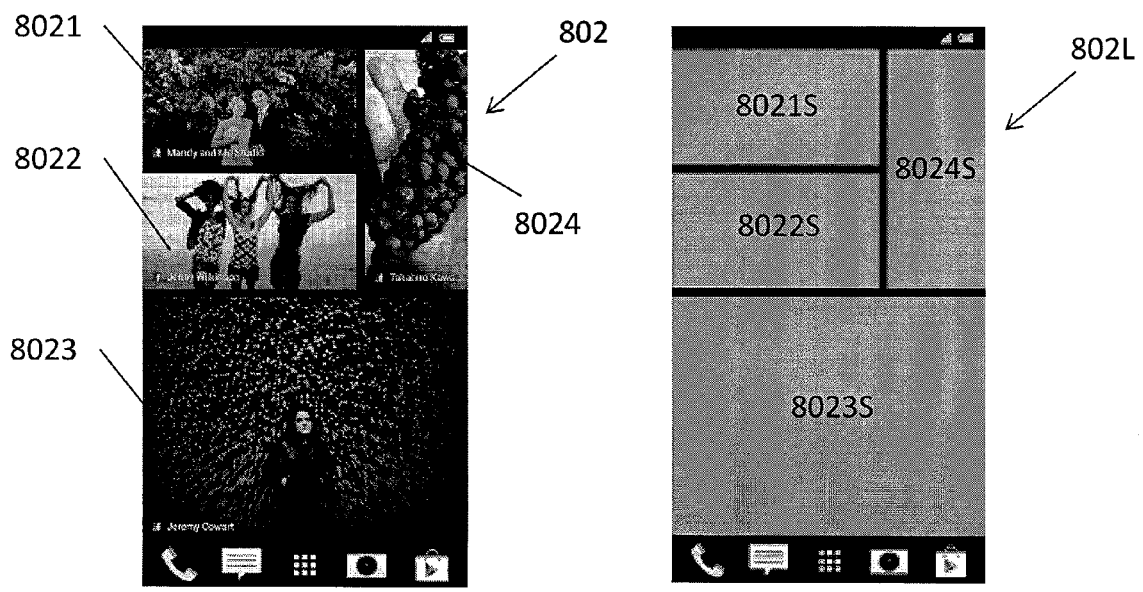

As embodied in FIGS. 8A and 8B (in particular FIG. 8B), each page 801/802 has a layout 801L/802L of a plurality of slots 8011S-8013S/8021S-8024S, and each of the slots 8011S-8013S/8021S-8024S is for accommodating a corresponding one of the tiles 8011-8013/8021-8024.

Figure 9:
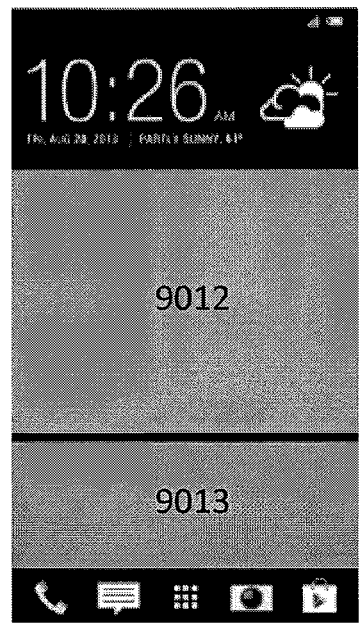
FIG. 9 illustrates the location changes to the tiles and the layout changes when a new tile is inserted into the home screen in accordance with an exemplary embodiment of the present invention.
Figure 9:
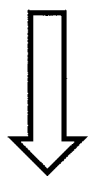
Figure 9:
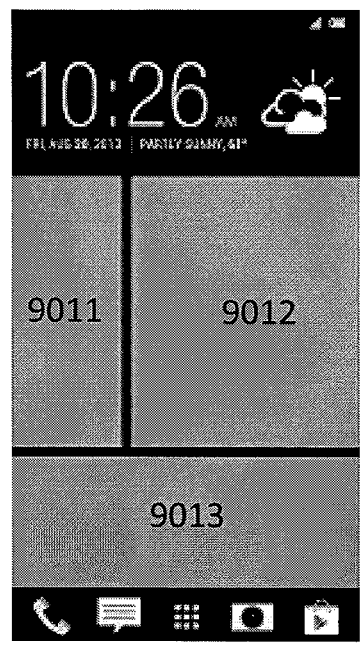

In addition, after an update that results in insertion of at least one new tile into the home screen occurs, the at least one new tile displaying a new feed is displayed on the top page, and at least one existing tile that was on the top page prior to the update is moved to a new, different location of the home screen. For example, as mentioned, the page 802 immediately below the top page 801 may be the previous top page with tiles 8021-8024, and the current top page 801 is added immediately above the top page 801 after an update that results in insertion of at least one new tile (e.g., tiles 8011-8013) into the home screen occurs. In another embodiment, it is also possible that only one new tile is added into the top page resulting from the update; in this case, at least one existing tile that was on the top page prior to the update is moved to a new, different location of the home screen. For example, as shown in FIG. 9, the top page prior to the update may only have two tiles 9012, 9013, and the insertion of the new tile 9011 will change the location of at least one of the existing tiles 9012, 9013 on the top page.

Figure 10:
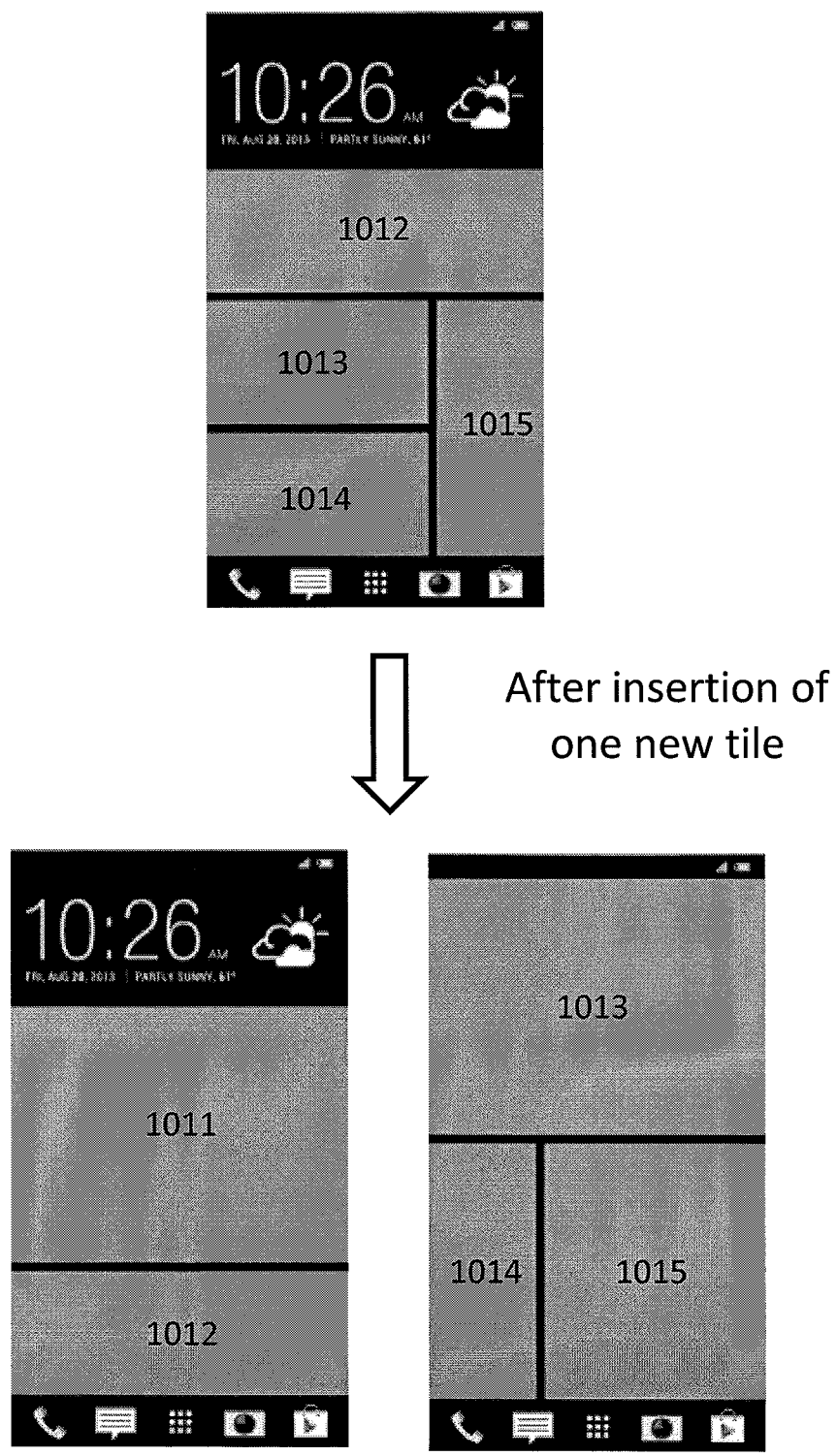
FIG. 10 illustrates the location changes to the tiles and the layout changes when a new tile is inserted into the home screen in accordance with another exemplary embodiment of the present invention.

In another embodiment, as shown in FIG. 10, it is also possible that the top page prior to the update may have four (4) tiles 1012, 1013, 1014, 1015 (which for example the maximum number of tiles in a page), and the insertion of one new tile will add a new top page and push the previous top page to be below the new top page. The new top page includes the new tile 1011 and one pre-existing tile 1012 (the location of which has been changed), and the other three pre-existing tiles 1013, 1014, 1015 are located on the page that is immediately below the new top page.

In an exemplary embodiment, when a total number of pages after the update exceeds a predetermined number by N (N>0), a last N page(s) at the bottom of the home screen is (are) removed from the home screen. For example, when the home screen is currently display a maximum number of pages, e.g., thirty pages, and two new pages are to be added to the home screen after an update, then the last two pages at the bottom of the home screen will be removed from the home screen and the two new pages will be added to the top of the home screen.

Figure 11:
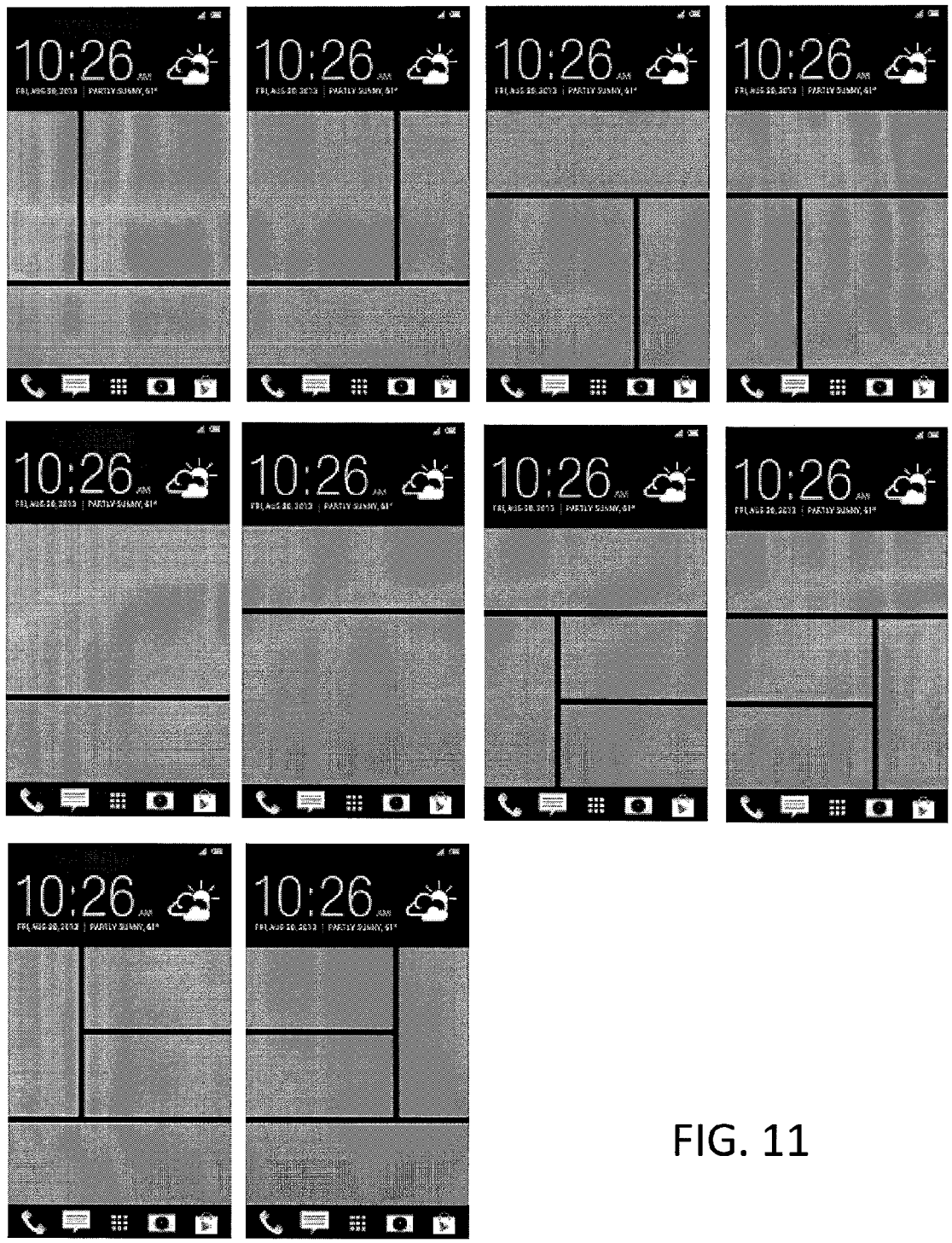
FIG. 11 illustrates several pre-defined layouts of the top page of the home screen in accordance with exemplary embodiments of the present invention.
Figure 12:
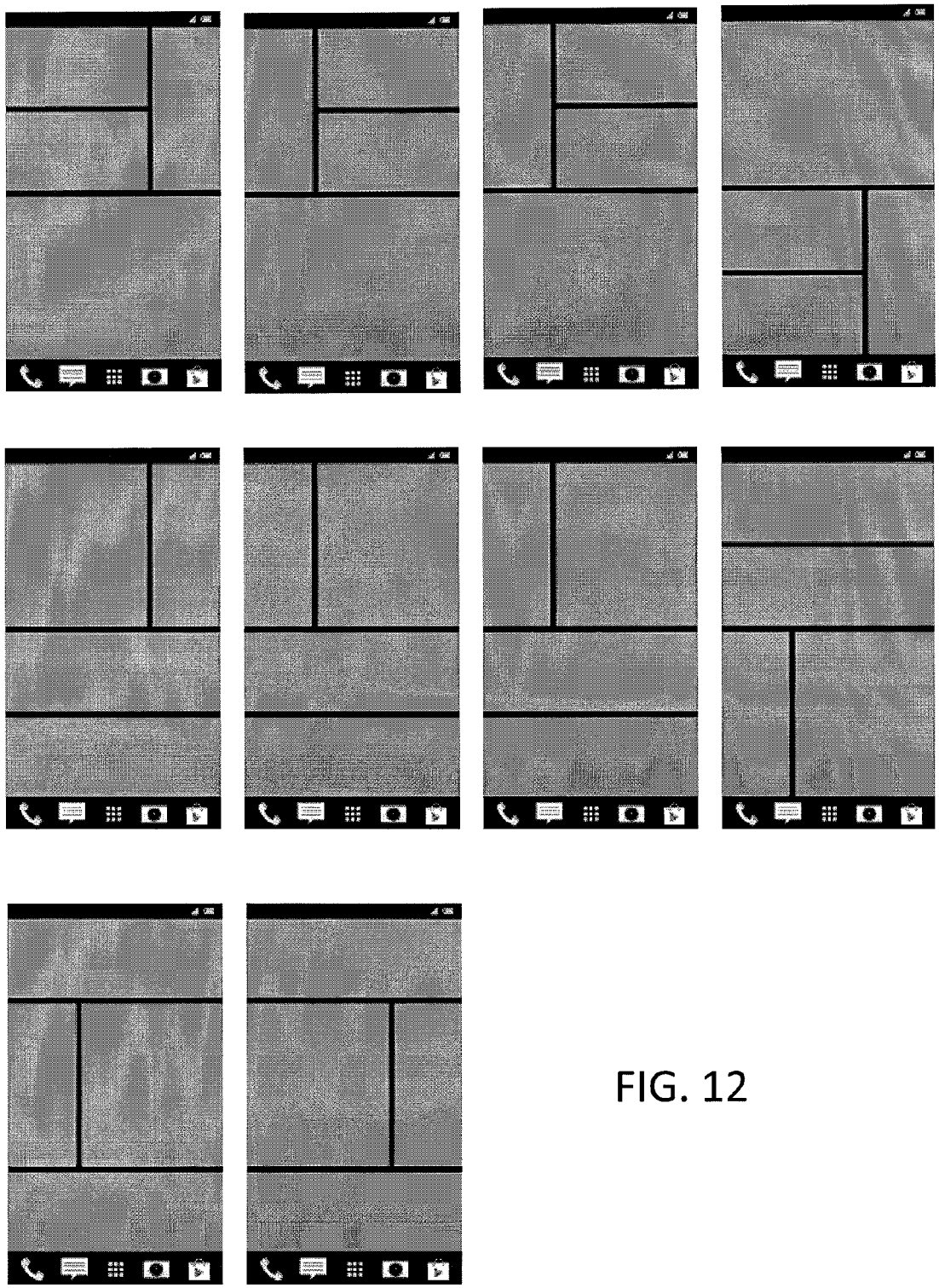
FIG. 12 illustrates several pre-defined layouts with four (4) slots for the page below the top page of the home screen in accordance with exemplary embodiments of the present invention.
Figure 13:
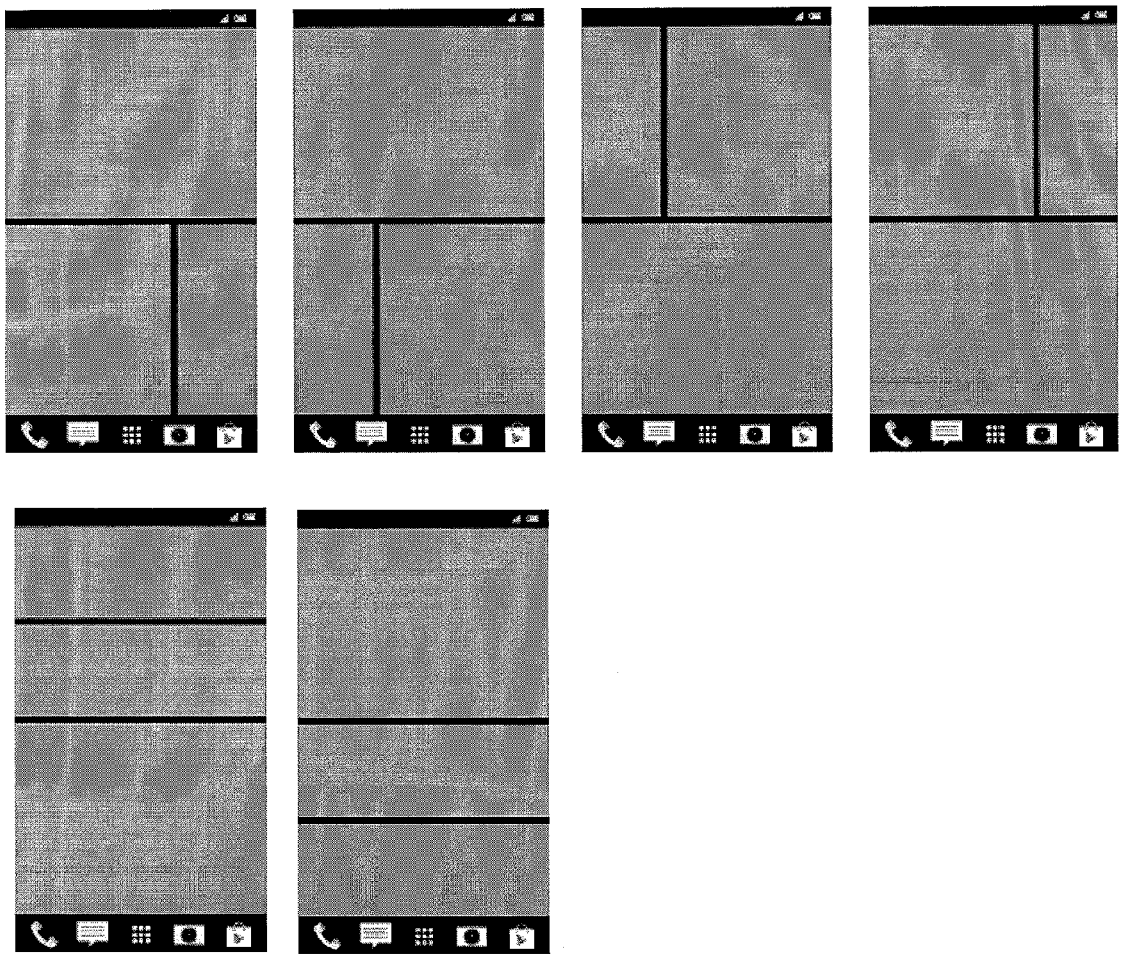
FIG. 13 illustrates several pre-defined layouts with three (3) slots for the page below the top page of the home screen in accordance with exemplary embodiments of the present invention.

In an exemplary embodiment, a layout of the new page is randomly selected from a plurality of pre-defined layouts. In an exemplary embodiment, a layout of the top page is randomly selected from a plurality of pre-defined layouts. For example, a layout of the new page or the top page is randomly selected from a plurality of pre-defined layouts as shown in FIGS. 11-13. As shown in FIGS. 11-13, the pre-defined layouts may have two, three or four slots. It should be noted that the pre-defined layouts shown in FIGS. 11-13 are simply examples to illustrate the present invention, and other pre-defined layouts with different configuration and/or different (more or less) slots are also possible. When a plurality of new feeds are to be added to the home screen after an update occurs, the layout of each page is randomly selected as long as the total number of the slots match the total number of new feeds.

In an exemplary embodiment, a weather tile that displays a current time, a current date and latest updated weather information is placed in the home screen and immediately above the top page, and a size and a location of the weather tile are fixed prior to and after the update. For example, as shown in FIG. 8A, a weather tile 8010 that displays a current time, a current date and latest updated weather information is placed in the home screen and immediately above the top page 801, and a size and a location of the weather tile 801 are fixed prior to and after the update.

In an embodiment, the feeds are categorized into a plurality of categories. In an exemplary embodiment, the categories include a local content feed category in which the content of the feed is locally stored in the mobile communications device or generated by an application in the mobile communications device (e.g., photo, audio, video clips, applications, etc. locally stored in the mobile communications device), a social network feed category in which the content of the feed is retrieved from a social network service (e.g., Facebook, MySpace, Twitter, Plurk, Linkedin, Flicker, etc.), and a News feed category in which the content of the feed is retrieved from an Internet network service.

In an exemplary embodiment, the tiles are arranged in the home screen in an order based on the categories of the feeds. For example, the local content feeds, social network feeds and news feeds can be displayed with a first, a second and a third priority, respectively. In an exemplary embodiment, the tiles displaying the feeds within a same category in the home screen are arranged in a chronological order. In another exemplary embodiment, the tiles displaying the feeds within a same category are arranged based on usage of the feeds within the same category. For example, if the user uses the feeds from a particular social network server more often than the feeds from another social network server, the feeds from the particular social network server will have a higher priority to be displayed on the home screen than those from another social network server.

In another embodiment, a layout of the new page and the top page is randomly selected from a plurality of pre-defined layouts until the number of the new feeds is equal to or less than a predetermined number. This predetermined number is the sum of the maximum number of slots in any of the pre-defined layouts and the minimum number of slots in any of the pre-defined layouts. As mentioned, a layout of the new page and the top page is randomly selected from a plurality of pre-defined layouts until the number of the new feeds is equal to less than a predetermined number that is the sum of the maximum number of slots in any of the pre-defined layouts and the minimum number of slots in any of the pre-defined layouts. If the pre-defined layouts have M, N, O, . . . X slots (wherein M<N<O< . . . <X), then a layout of the page can no longer be randomly selected from a plurality of pre-defined layouts when the number of the new feeds is equal to or less than (X+M)−1, wherein X is the maximum number of slots in any of the pre-defined layouts, and M is the minimum number of slots in any of the pre-defined layouts For example, if the pre-defined layouts have two, three, four or five slots, when there are only six (5+2−1=6) or less new feeds remaining to be inserted, the layout(s) to be selected will be limited to make sure that all remaining new feeds will be displayed.

Using the pre-defined layouts shown in FIGS. 11-13 as an example, the pre-defined layouts may have two, three or four slots. When a total number of ten new feeds are to be added to the home screen, the layout of the first new page can be randomly selected to display some of the new feeds. However, in this example, when there are only five (4+2−1=5) or less new feeds remaining to be inserted, the layout can no longer be randomly selected. For example, if the randomly selected layout has four slots, and four of the five new feeds are inserted into the layout, then only one new feed remains to be inserted. However, the pre-defined layouts do not have any layout with only 1 slot, and therefore cannot be selected to display the last new feed. Therefore, in this example, when there are only five or less new feeds remaining to be inserted, the layout(s) to be selected will be limited to make sure that all remaining new feeds will be displayed. For example, in the case there are only five new feeds remaining to be inserted, only one layout of two slots and one layout of two slots will be selected to display the last five new feeds.

In another embodiment, a layout of the new page and the top page is randomly selected from a plurality of pre-defined layouts until the number of the new feeds is less than the minimum number of slots in any of the pre-defined layouts, and the remaining feed(s) will then be discarded. For example, the pre-defined layouts may have two, three or four slots as shown in FIGS. 11-13. When a total number of ten new feeds are to be added to the home screen, the layout of the first new page can be randomly selected to display some of the new feeds. When there are only five new feeds remaining to be inserted, the layout can still be randomly selected. For example, if the randomly selected layout has four slots, and four of the five new feeds are inserted into the layout, then only one new feed remains to be inserted. However, the pre-defined layouts do not have any layout with only 1 slot, and therefore cannot be selected to display the last new feed. In this case, the only remaining new feed will be discarded.

In another exemplary embodiment, the tiles are arranged in the home screen in an order based on the categories, the sub-categories, the resolution/size of the photos, and the timestamp (chronological order) of the feeds, and the tiles are arranged in a corresponding layout is arranged based on the resolution/size of the photo of the feeds. For example, in an exemplary embodiment shown in FIG. 14, there are three categories (e.g., a local content feed category, a social network feed category and a News feed category), and each category has a number of sub-categories (e.g., the social network feed category has three sub-categories: Facebook, Twitter, Linkedin; the News feed category has two sub-categories: Yahoo, MSN; the local content feed category has two sub-categories: photo, video.

In this exemplary embodiment, a total budget of ninety feeds can be inserted for an update, each category has a budget of thirty feeds to be inserted for an update, and each sub-category of the social network feed category has a budget of ten feeds, and each sub-category of News feed category and of local content feed category has a budget of fifteen feeds for an update. When each sub-category has more than the predetermined number of feeds (e.g., ten feeds for Facebook) available to be updated, the feeds in the same sub-category are first sorted based on the resolution or size of the photo in the feeds (the higher/larger the resolution/size, the higher priority the feed has). If the feeds have no photo, they will have lowest priority in the same sub-category. Then the predetermined number of feeds with the highest priority will be selected and the rest feeds will be discarded. If any sub-category has less than the predetermined number of feeds available for an update, all available feeds in the sub-category will be selected. It should be noted that the above example is simply used for illustration purposes. It is also possible to set the same budget or different budgets for different categories/subcategories, as long as the total budget of feeds is the same. For example, the budget for the local content feed category, the social network feed category, the News feed category can be twenty feeds, fifty feeds and twenty feeds (total of ninety feeds), and the budget for the sub-categories of the social network feed category can be thirty feeds for Facebook, fifteen feeds for Twitter, and five feeds for Linkedin.

After all feeds for each sub-category are selected, the feeds in the same sub-category are sorted in a chronological order with the newest feed on the top. In other words, each sub-category has a sorted list of feeds in a chronological order, as shown in FIG. 14. As shown in FIG. 14, the higher the feeds are located in the sub-category, the newer the feeds are in the sub-category.

Before inserting the feeds in the layouts, the layouts are randomly selected, and the feeds will be selected based on the category order (e.g., local content feed→social network feed→News feed), the subcategory order (e.g., photo→video, Facebook→Twitter→LinkedIn, Yahoo→MSN), and the chronological order of the feeds in the subcategory, and are inserted into the randomly selected layout. For example, if a layout of 4 slots is selected for the top page, the newest feed in the photo sub-category (P1), the newest feed of the Facebook (F1), the newest feed of Yahoo (Y1), and the newest video feed in the video sub-category (V1) are selected and to be inserted into the randomly selected layout; if a layout of four slots is selected for the second page, the feeds that are selected and to be inserted into the randomly selected layout will be T1, M1, P2, L1; if a layout of three slots is selected for the third page, the feeds that are selected and to be inserted into the randomly selected layout will be Y2, V2, F2 . . . . If there is no feed available to be selected in a particular sub-category of a category during this process, the feed in the next available sub-category in the same category will be selected. If there is no feed available to be selected in a particular category, the feed in the next available sub-category in the next available category will be selected. This process continues until all feeds are selected. By selecting the feeds in this manner, it can diversify the feeds in a single page, which are likely selected from different categories/sub-categories.

In addition, for the feeds that are selected for a particular page, the feeds having photos with higher resolution/size will be assigned to bigger slots, and the feeds having photos with lower resolution/size or having no photo will be assigned to smaller slots.

In an exemplary embodiment, a processor of the mobile communications device is configured to perform the process of configuring a home screen of a mobile communications device. In another exemplary embodiment, a non-transitory computer-readable medium (e.g., a memory device in the mobile communications device/processor or an external memory device accessible by the mobile communications device/processor) containing a computer program product comprising mobile communications device executable instructions can be executed by the mobile communications device to perform the process of configuring a home screen of a mobile communications device.

In order to configuring a home screen of a mobile communications device, as further embodied in the present application, a mobile communications device comprises a processor configured to select some of candidate feeds from one or more of feed sources based on a predetermined budget, and configured to insert the selected feeds into a home screen, wherein each of the candidate feeds is categorized into one of a plurality of categories, and the predetermined budget sets a first predetermined maximum number of feeds to be selected in a corresponding one of the categories; and a display panel connected to the processor and displaying the home screen that displays the selected feeds.

Figure 15:
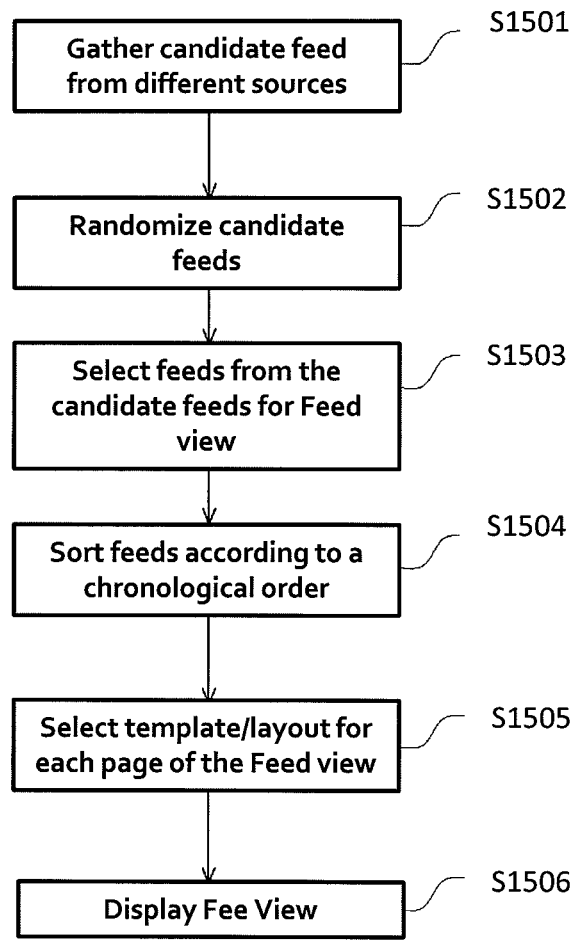
FIG. 15 is a flow chart illustrating selecting templates/layouts to display Feed contents in accordance with an exemplary embodiment of the present invention.

FIG. 15 is a flow chart illustrating selecting template sizes to display Feed contents in accordance with an exemplary embodiment of the present invention. The objective is to construct the Feed view according to a need of the user. In step S1501, the candidate feeds to be displayed are gathered from a variety of different sources. The candidate feeds may include photographs, motion pictures, text, and etc. In step S1502, the candidate feeds are randomized to ensure that all variety of different sources would be displayed. The purpose is to expose a user to a variety of different sources. In step S1503, the feeds to be displayed in the Feed view is selected from candidate feeds. In step S1504, the selected feeds are sorted according to a chronological order such that the Feed view will be presented page by page basically in a chronological order. In an exemplary embodiment, a layout of each of one or more pages is selected from a plurality of predefined layouts, each layout has a plurality of slots, each of the slots is for accommodating a corresponding one of the selected feeds, and the selected feeds are inserted into the slots. In an exemplary embodiment, the layout of each page is selected based on contents of the selected feeds to be inserted in the same page. For example, in step S1505, for each page of the Feed view, a most suitable frame layout will be selected from a set of predetermined frame layouts. In step S1506, the Feed view is constructed and displayed in the mobile communications device. A more specific embodiment is elucidated as follows.

Assuming that it is desired to construct a Feed view to maximize the display of photographs. In step S1501, candidate feeds are to be gathered from a variety of difference sources. The sources could include sources from external social network servers such as Facebook, Myspace, Twitter, Plurk, Linkedin, Flicker, and etc. The sources could be synchronized from external news network such as Yahoo news, Google news, etc. The sources could otherwise include data which is native to the storage medium of the mobile communications device. For example, the feeds could be a photograph which could be opened by a gallery application. The feeds could be multimedia data such as motion pictures, photographs, drawings, etc. The feeds could be one or more events from a calendar application or a daily planner. The feeds could be one or more sale information or coupons from the application like Best deals, and so forth.

In step S1502, the candidate feeds are randomized to ensure that all variety of different sources would be displayed. In order to expose a user to a variety of different sources, a budget would be assigned for each category of sources of information. For example, a budget of thirty feeds could be assigned to the social network so that the Feed view would contain no more than thirty feeds of information from the social network. Similarly, a budget of forty feeds could be assigned to the news source. A budget of ten feeds could be assigned from data native to the mobile communications device. It should be noted that these numbers are merely exemplary and are not construed as limitations. It also should be noted that, the over budgeting could be used so that the mobile communications device could consider more than the budgeted number of feeds to ensure more candidate items are considered and eventually eliminate the number of feeds which exceed the budget.

In an exemplary embodiment, when a first one of the selected feeds to be inserted in the same page includes a picture and a second one of the selected feeds to be inserted in the same page includes no picture, the layout of the same page is selected to have a larger slot for accommodating the first one of the selected feeds and a smaller slot for accommodating the second one of the selected feeds. In an exemplary embodiment, when a first one of the selected feeds to be inserted in the same page includes a picture with a higher resolution or size, and a second one of the selected feeds to be inserted in the same page includes a picture with a lower resolution or size, the layout of the same page is selected to have a larger slot for accommodating the first one of the selected feeds and a smaller slot for accommodating the second one of the selected feeds. In an exemplary embodiment, at most the first predetermined maximum number of feeds is selected from the candidate feeds based on a grade assigned to each of the candidate feeds. In an exemplary embodiment, the grade assigned to each of the candidate feeds is assigned based on existence of a picture in each of the candidate feeds, and further based on a resolution or a size of an existing picture in any of the candidate feeds.

For example, the consideration criteria could be based on the quality/resolution or the size of pictures. For example, the pictures could be assigned to a grade from "1" to "5" with "5" being the highest grade. Pictures with the most number of pixels or the highest resolution or the maximum size could be assigned "5", and a text without pictures could be assigned "1", and others in between.

In an exemplary embodiment, the selected feeds from a same one of the categories are inserted into the home screen in a predetermined order. In an exemplary embodiment, the predetermined order is a chronological order. In an exemplary embodiment, the selected feeds from the same one of the categories are sorted in the chronological order before insertion into the home screen. In an exemplary embodiment, at least one of the categories includes a plurality of sub-categories, wherein the predetermined budget sets a second predetermined maximum number of feeds to be selected from a corresponding one of the sub-categories, and wherein the second predetermined maximum number is smaller than the first predetermined maximum number. In an exemplary embodiment, at most the second predetermined maximum number of feeds are selected from the candidate feeds in the corresponding one of the sub-categories based on an assigned grade to each of the candidate feeds in the corresponding one of the sub-categories. In an exemplary embodiment, the grade assigned to each of the candidate feeds in the corresponding one of the sub-categories is assigned based on existence of a picture in each of the candidate feeds in the corresponding one of the sub-categories, and further based on a resolution or a size of an existing picture in any of the candidate feeds in the corresponding one of the sub-categories. In an exemplary embodiment, at least one of the categories includes a plurality of sub-categories, and in the inserting step the selected feeds from a same one of the sub-categories are inserted into the home screen in a predetermined order. In an exemplary embodiment, the predetermined order is a chronological order. In an exemplary embodiment, the selected feeds from the same one of the sub-categories are sorted in the chronological order before insertion into the home screen. In an exemplary embodiment, the categories include a local content feed category in which the content of the feed is locally stored in the mobile communications device or generated by an application in the mobile communications device, a social network feed category in which the content of the feed is retrieved from a social network service, and a News feed category in which the content of the feed is retrieved from an Internet network service.

For example, to further ensure a yet better randomization, a budget could be assigned to a category of information. For example, a budget of 30 feeds of information is set to be from the social network. A budget of ten could be assigned to Facebook, ten feeds could be from Twitter, and ten feeds could be from Plurk, etc. Each source of the social network could be assigned a minimum quota that so that each sub-category would be required to have a certain number of sources.

In step S1503, the feeds to be displayed in the Feed view is selected from candidate feeds. When it is desired to maximum the number of pictures displayed in the Feed view, then the feeds with the highest score would be selected first. For example, if a budget of ten feeds are assigned to Yahoo news, but fifteen feeds (over-budgeting) are available for consideration, then fifteen feeds would be ranked according to their highest score/grade, and ten items with the best score will be selected from the fifteen available feeds.

In step S1504, the selected feeds are sorted according to a chronological order such that the Feed view will be presented page by page in a chronological order. After the candidate feeds have been selected in step S1503, in step S504, the feeds which have been chosen to be displayed would be sorted according to a chronological order so that the most recent feed would be displayed at the top of the Feed view, and the most ancient feed would be basically displayed at the very bottom.

In step S1505, for each page of the Feed view, a most suitable frame layout will be selected from a set of predetermined frame layouts. In an exemplary embodiment, a variety of different frame layout templates are predefined and stored in the storage medium of the mobile communications device. The goal of step S1505 is to match the sorted data with the template having the most suitable shape in order to fit the pictures. In an exemplary embodiment, a weather tile that displays a current time, a current date and latest updated weather information is placed in the home screen and immediately above the selected feeds, wherein a size and a location of the weather tile are fixed. For example, if for the top page of the Feed view, the most recent feeds contain 2 large photographs, the layout/template selected will most likely be a template with a weather tile on top and the remaining space evenly or unevenly divided for the 2 large photographs. On the other hand, if a page does not contain any feeds that have pictures but text, then a template with numerous smaller slots could be selected.

In step S1506, the Feed view is constructed and displayed in the mobile communications device. In one exemplary embodiment, the Feed view would contain at most 80 pages of Feed view with each page matching the screen size. The top page would contain a weather, time, and data information. The user may scroll among the pages according to a touch and swipe action up or down. When the user scrolls to the top most page and apply a tug on the top most page, a menu bar could appear. An update of the Feed view could be triggered only if the scrolling velocity is below a velocity threshold, and the pulling distance must be above a distance threshold.

In an exemplary embodiment, a processor of the mobile communications device is configured to perform the process of configuring a home screen of a mobile communications device. In another exemplary embodiment, a non-transitory computer-readable medium (e.g., a memory device in the mobile communications device/processor or an external memory device accessible by the mobile communications device/processor) containing a computer program product comprising mobile communications device executable instructions can be executed by the mobile communications device to perform the process of configuring a home screen of a mobile communications device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of activating an update of a home screen of a mobile communications device, the home screen being displayed on a display panel of the mobile communications device, the home screen comprising a plurality of tiles displaying a plurality of feeds from one or more feed sources, the method comprising:
   selectively performing one of updating the home screen, and activating and displaying a menu bar on the display panel based on a distance of downward tugging on the display panel and a speed of the downward tugging on the display panel,
   wherein the tugging on the display panel is a touch gesture performed on the home screen, and said updating the home screen and said activating and displaying the menu bar are two alternatives and when said activating and displaying the menu bar is selected to be performed, the menu bar remains being displayed on the home screen after the downward tugging is completed, and the home screen is not updated, and
   wherein the step of selectively performing comprises the steps of:
     measuring the distance of the downward tugging on the display panel;
     measuring the speed of the downward tugging on the display panel;
     activating and displaying the menu bar on the display panel while not updating the home screen when either the speed of the downward tugging is determined to be greater than the predetermined speed threshold, or the speed of the downward tugging is determined to be not greater than the predetermined speed threshold but the distance of the downward tugging is determined to be not greater than the predetermined distance threshold; and
     updating the home screen only when the speed of the downward tugging is determined to be not greater than the predetermined speed threshold and the distance of the downward tugging on the display panel is determined to be greater than a predetermined distance threshold.

2. The method of claim 1, further comprising:
displaying on the home screen an initiation requirement to be fulfilled to initiate updating the home screen when the distance of the downward tugging on the display panel is determined to be greater than the predetermined distance threshold,
wherein the step of updating the home screen includes updating the home screen upon fulfillment of the initiation requirement.

3. A non-transitory computer-readable medium containing a computer program product comprising mobile communications device executable instructions for activating an update of a home screen of a mobile communications device, the home screen being displayed on a display panel of the mobile communications device, the home screen comprising a plurality of tiles displaying a plurality of feeds from one or more feed sources, the mobile communications device executable instructions comprising:
selectively performing one of updating the home screen, and activating and displaying a menu bar on the display panel based on a distance of a downward tugging and a speed of the downward tugging on the display panel,
wherein the tugging on the display panel is a touch gesture performed on the home screen, said updating the home screen and said activating and displaying the menu bar are two alternatives, and when said activating and displaying the menu bar is selected to be performed, the menu bar remains being displayed on the home screen after the downward tugging is completed, and the home screen is not updated, and
wherein the mobile communications device executable instructions further comprise:
measuring the distance of the downward tugging on the display panel;
measuring the speed of the downward tugging on the display panel;
activating and displaying the menu bar on the display panel while not updating the home screen when either the speed of the downward tugging is determined to be greater than the predetermined speed threshold, or the speed of the downward tugging is determined to be not greater than the predetermined speed threshold but the distance of the downward tugging is determined to be not greater than the predetermined distance threshold; and
updating the home screen only when the speed of the downward tugging is determined to be not greater than the predetermined speed threshold and the distance of the downward tugging on the display panel is determined to be greater than a predetermined distance threshold.

4. A mobile communications device comprising:
a display panel displaying a home screen; and
a processor connected to the display panel and configured to configure the home screen displayed on the display panel, the home screen comprising a plurality of tiles displaying a plurality of feeds from one or more feed sources, wherein the processor is further configured to:
selectively perform one of updating the home screen, and activating and displaying a menu bar on the display panel based on a distance of a downward tugging and a speed of the downward tugging on the display panel,
wherein the tugging on the display panel is a touch gesture performed on the home screen, said updating the home screen and said activating and displaying the menu bar are two alternatives, and when said activating and displaying the menu bar is selected to be performed, the menu bar remains being displayed on the home screen after the downward tugging is completed, and the home screen is not updated, and
wherein the process is further configured to:
measure the distance of the downward tugging on the display panel;
measure the speed of the downward tugging on the display panel;
activate and display the menu bar on the display panel while not updating the home screen when either the speed of the downward tugging is determined to be greater than the predetermined speed threshold, or the speed of the downward tugging is determined to be not greater than the predetermined speed threshold but the distance of the downward tugging is determined to be not greater than the predetermined distance threshold; and
update the home screen only when the speed of the downward tugging is determined to be not greater than the predetermined speed threshold and the distance of the downward tugging on the display panel is determined to be greater than a predetermined distance threshold.

5. The mobile communications device of claim 4, wherein the processor is further configured to:
display on the home screen an initiation requirement to be fulfilled to initiate updating the home screen when the distance of the downward tugging on the display panel is determined to be greater than the predetermined distance threshold,
wherein the processor is further configured to update the home screen upon fulfillment of the initiation requirement.

6. The mobile communications device of claim 5, wherein the processor is further configured to:
display on the home screen a time of a last update of the home screen with the initiation requirement when the distance of the downward tugging on the display panel is determined to be greater than the predetermined distance threshold; and
display an updating progress on the home screen until completion of updating the home screen.

7. The mobile communications device of claim 4, wherein the menu bar includes at least one touch button to trigger at least one of a browse operation, a search operation, a social network service, and a linking operation to an external server.

* * * * *